April 21, 1959        A. G. EMSLIE        2,883,657
MOVING TARGET RADAR SYSTEM
Filed May 8, 1946
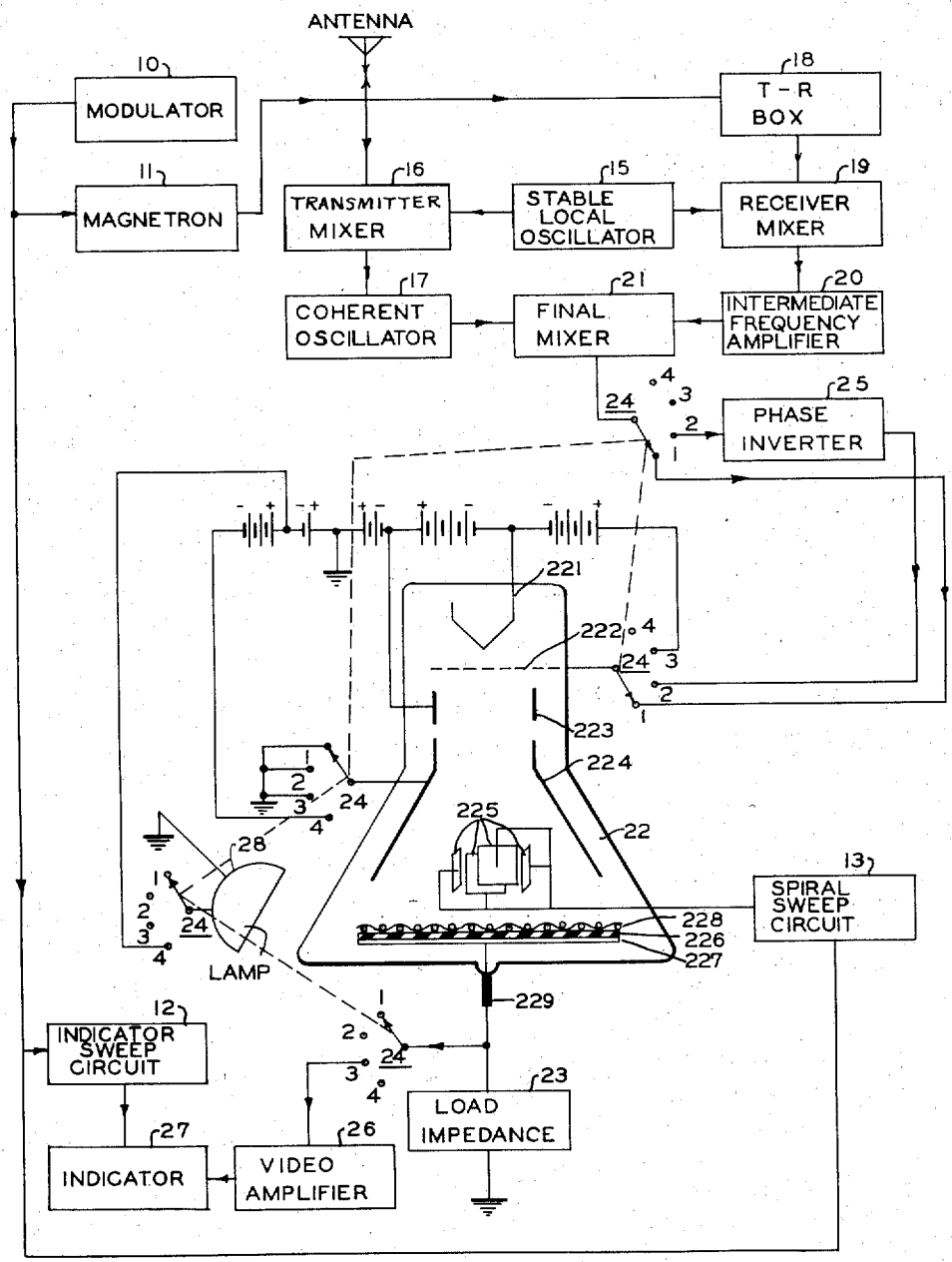
INVENTOR
ALFRED G. EMSLIE
BY
ATTORNEY United States Patent Office 2,883,657
Patented Apr. 21, 1959

2,883,657

MOVING TARGET RADAR SYSTEM

Alfred G. Emslie, Altoona, Pa., assignor, by mesne assignments, to the United States of America as represented by the Secretary of the Navy Application May 8, 1946, Serial No. 668,030

9 Claims. (Cl. 343—7.7)

This invention relates to apparatus for providing moving target indication, and more particularly to such apparatus employing a storage tube relay device.

In conventional radar systems the echoes which are received from fixed targets such as hills, trees, islands, and buildings frequently prevent the perception of moving target echoes. Several systems have been devised which distinguish between moving targets and fixed targets by the character of the video pulses obtained from the echoes reflected by these targets. Most systems of this character are based upon the principle of maintaining stable reference oscillations synchronized with the transmitted, short duration, exploratory pulses, obtaining echo pulses from both fixed and moving targets, and combining the echo pulses with the reference oscillations to obtain video pulses for examination. The amplitude of the video pulses obtained in this manner is a function of the relative phase between the echo pulses and the reference oscillations. Fixed targets reflect successive echo pulses having a constant phase relationship to the reference oscillations. Moving targets, on the other hand, reflect successive echo pulses having a progressive phase shift with respect to the reference oscillations. These phenomena result in video pulses having constant amplitude for fixed targets, but video pulses having cyclically varying amplitudes for moving targets. By presenting the video pulses from both fixed and moving targets on a cathode ray oscilloscope to indicate signal strength versus range, the character of the video pulses serves to distinguish between fixed and moving targets. However, with the conventional plan-position-indicator indicating only range and bearing there is nothing in the character of the video pulses that can be used to distinguish between them. A delay line has been used to delay the video pulse pattern for one radar pulse interval. Then by subtracting the delayed video pulse pattern from an undelayed video pulse pattern the video pulses representing fixed targets cancel out while those representing moving targets give a difference video pulse. A delay line for this purpose is necessarily cumbersome and intricate and difficult to adjust.

Therefore it is an object of this invention to provide apparatus which will produce moving target indication on any standard radar indicator.

Another object of this invention is to provide apparatus which will produce only moving target indications and eliminate fixed target indications.

It is a further object of this invention to provide such apparatus using a storage tube as a comparison device.

These and other objects will become apparent upon consideration of the following description in conjunction with the accompanying drawing which is a block diagram of a radar system incorporating one embodiment of this invention.

The drawing discloses the coherent oscillator type of radar system which is normally used in moving target indication systems including a storage tube as the delay device. Modulator 10 determines the pulse repetition frequency and the pulse length of the output of magnetron 11. In addition, each time magnetron 11 is caused to transmit a short duration pulse of radio frequency energy, modulator 10 supplies a trigger voltage to indicator sweep circuit 12, and spiral sweep circuit 13. During each transmitted pulse the output of stable local oscillator 15 mixes with the radio frequency energy in the transmitted pulse in transmitter mixer 16 to give an intermediate frequency pulse for synchronizing coherent oscillator 17. Transmit-receive box 18 effectively disconnects receiver mixer 19 during each transmitted pulse to protect it from the damage which would result if the full power of magnetron 11 were directly applied to it. During the interval between transmitted pulses, hereafter to be called the pulse interval, transmit-receive box 18 reconnects receiver mixer 19 and echo pulses from targets are received. The radio frequency energy in the echo pulses is mixed with the output of stable local oscillator 15 in receiver mixer 19 to give intermediate frequency pulses which are then amplified by intermediate frequency amplifier 20. The intermediate frequency oscillations of coherent oscillator 17 which were synchronized during the transmitted pulse but maintained throughout the entire pulse interval are mixed with the intermediate frequency pulses from intermediate frequency amplifier 20 in final mixer 21. The intermediate frequency pulses representing fixed targets will bear a constant phase relationship to the coherent oscillator 17 oscillations while those representing moving targets will have a progressive phase shift. Therefore, the video output from final mixer 21 will consist of video pulses of constant amplitude for fixed targets, but video pulses of cyclically varying amplitude for moving targets. As was pointed out above, this video output from final mixer 21 could be viewed directly on an indicator which showed range versus signal strength and it would be possible to distinguish between fixed and moving targets although the fixed target indication would clutter up the screen and make the perception of moving target indications difficult. Furthermore, on a plan-position-indicator showing only range and bearing no differentiation could be made between fixed and moving targets.

This invention in broad terms makes possible the elimination of fixed target indication and the presentation of only moving target indication on any type of radar indicator by delaying the video pulse pattern from alternate pulse intervals by a time equal to one pulse interval and then subtracting it from the video pulse pattern from the following pulse interval. In this way video pulses from fixed target which have constant amplitude will cancel, but video pulses from moving targets which have a cyclic variation in amplitude will give difference video pulses representing the moving targets.

The drawing discloses some details in schematic form of one embodiment of a storage tube 22 which may be used in this invention. Storage tube 22 is of the iconoscope type and comprises an electron gun including cathode 221, grid 222, first anode 223, and second anode 224, electrostatic deflection plates 225 for deflecting the electron beam from the electron gun, and a mosaic upon which the electron beam impinges consisting of a dielectric plate 226, a metallic coating on one side thereof called the signal plate 227, and a coating of a myriad of separately insulated microscopic emissive particles on the other side thereof called the emissive surface 228. Second anode 224 is normally connected to ground potential, first anode 223 is connected to a slightly negative source of potential, and cathode 221 is connected to a very negative source of potential. Grid 222 is biased at a potential slightly positive with respect to that of cathode 221 but its potential is variable about the bias potential for the purpose of intensity modulating the electron beam. A connection from the signal plate 227 is brought out to an output terminal 229. Under certain conditions an output signal may be developed across a load impedance 23 connected to output terminal 229.

In brief the action of the mosaic is as follows: an electron beam impinging upon a particle of emissive surface 228 causes the emission of secondary electrons. The nature of the emissive surface 228 is such that the particle emits more secondary electrons than there are primary electrons impinging upon it and the result is that the particle becomes positively charged. A corresponding negative charge is built up on the signal plate in the usual manner of a condenser. As the particle of emissive surface 228 becomes increasingly positive with the emission of secondary electrons, fewer of these electrons are emitted because the positive potential draws them back. A state of equilibrium is reached when the number of secondary electrons being emitted from the particle is equal to the number of primary electrons impinging upon it. Thus a change is built up on each condenser comprising a particle of the emissive surface 228 and the signal plate which is proportional to the intensity of the electron beam impinging on the particle.

Emissive surface 228 exhibits photoemissive characteristics in addition to the secondary electron emissive characteristic described above. Illumination of emissive surface 228 causes the emission of photoelectrons which may be collected by an electrode of positive potential or retarded by an electrode of negative potential and made to fall back in random fashion on the emissive surface 228. Both the photoemissive and the secondary electron emissive characteristics are employed in this invention.

The drawing also discloses switch 24 comprising five sections ganged together so that all sections are the same numbered position at the same time. In this embodiment switch 24 may be an electronic switch of one of the types well known in the art. In position 1 of switch 24 video output from final mixer 21 is applied directly to grid 222 of storage tube 22 to intensity modulate the electron beam thereof. In position 2 of switch 24 phase inverter 25 reverses the polarity of the video output of final mixer 21 and applies the reversed video output to grid 222. In position 3 of switch 24 grid 222 is connected directly to a source which is positive with respect to that of cathode 221 and the electron beam of storage tube 22 is intensified but unmodulated. Also in position 3 of switch 24 an output is taken from storage tube 22 across load impedance 23 to feed video amplifier 26. The amplified output from storage tube 22 is fed into indicator 27. In the first three positions of switch 24 second anode 224 is connected to ground potential. However, in position 4 second anode 224 is connected to a source of negative potential and lamp 28 is energized. Lamp 28 is of the gaseous type which responds instantaneously to energization. Indicator sweep circuit 12 for indicator 27 and spiral sweep circuit 13 for storage tube 22 are synchronized with the pulse repetition frequency of the magnetron 11 by a trigger voltage from modulator 10.

During every pulse interval spiral sweep circuit 13 causes the electron beam of storage tube 22 to sweep over the mosaic traversing the same path during each sweep. A sequence of operations is initiated when the charge is uniformly distributed over emissive surface 228. All sections of switch 24 are in position 1 for the first pulse interval. Grid 222 of storage tube 22 is connected directly to the output of final mixer 21 so that the electron beam is intensity modulated in accordance with the amplitude variations of the video pulse pattern. As the electron beam sweeps over the mosaic it leaves a track which is less negatively charged than the rest of the mosaic by reason of the secondary emission phenomenon on the emissive surface 228. The amount by which the negative charge is reduced at any point along the swept track depends upon the amplitude of the video pulse pattern at that instant. Thus there is a storage of the video pulse pattern in the form of charge variation along the swept track on the mosaic.

During the next, or second pulse interval, all sections of switch 24 are in position 2. The polarity of the output from final mixer 21 is thereby reversed before being applied to grid 222 of storage tube 22. This means that the intensity of the electron beam is now increased at points where it was previously diminished and vice versa. The result is that the variation in charge along the swept track on the mosaic are cancelled out except at those points where the output of final mixer 21 changed from one pulse interval to the next. Since the video pulses for fixed targets are of constant amplitude, the charge variation representing these fixed targets on the mosaic are cancelled. On the other hand, since the video pulses for moving targets have cyclically varying amplitude the charge variations representing them do not completely cancel.

During most of the third, or final pulse interval of the sequence, directions of switch 24 are in position 3 where grid 222 of storage tube 22 is connected to a source of positive potential with respect to that of the cathode. The intensity of the electron beam is thereby increased but unmodulated for the third sweep. As the emissive surface 228 is scanned with the more intense beam there is a uniform secondary electron emission until a point along the swept track is reached where a charge variation representing a moving target is stored. At such a point, for example, the stored charge variation might correspond to an excess of electrons. More secondary electrons would find it possible to escape from the emissive surface 228, and due to the condenser effect between the particle of emissive surface 228 and the signal plate 227, the charge on the latter would be adjusted in accordance with the change in charge on the former. This adjustment of charge through load impedance 23 would provide an output to video amplifier 26 which would be amplified thereby and viewed on indicator 27 as a moving target indication.

All sections of switch 24 are in position 4 for a few microseconds at the end of the third and final pulse interval of the sequence. Lamp 28 is energized and the illumination of emissive surface 228 causes photoemission. Second anode 224 is connected to a source of negative potential during the photoemission period to cause the photoelectrons to return to the emissive surface 228 in random fashion and cause the charge thereon to be distributed uniformly in preparation for the next sequence of events.

In the manner described a video output is obtained from output terminal 229 during the last of each group of three pulse intervals. This output will indicate only moving targets, the return from fixed targets having undergone substantially complete cancellation. In this embodiment storage tube 22 serves the dual purpose of delaying the video return and also of comparing the return from two successive pulse intervals.

This invention is to be limited only by the appended claims and not by the foregoing description which refers to only one embodiment of this invention.

What is claimed is:

1. In a radar system of the character described wherein fixed targets are evidenced by video pulses having substantially contant amplitudes and moving targets are evidenced by video pulses having cyclically varying amplitudes, a fixed target cancellation device comprising, a storage tube including one or more electron guns and a storage mosaic, means for storing video pulse patterns from said radar system with opposite polarity on each of two successive pulse intervals, means for obtaining an output from said storage tube during the third successive pulse interval, said output representing the difference between said video pulse patterns of said two preceding successive pulse intervals, and means for removing the residual charge on said mosaic at the end of said third successive pulse interval in preparation for a repetition of the sequence of events.

2. In a radar system of the character described wherein fixed targets are evidenced by video pulses having substantially constant amplitudes and moving targets are evidenced by video pulses having cyclically varying amplitudes, a fixed target cancellation device comprising, a storage tube including an electron gun, electrostatic deflection plates, and a storage mosaic having a signal plate, the grid of said electron gun being connected to said radar system during two successive pulse intervals to provide intensity modulation of the electron beam from said electron gun in accordance with the video pulse pattern from said radar system, a phase inverter to reverse the polarity of said video pulse pattern during the second of said two successive pulse intervals, a source of positive grid bias voltage, said grid of said storage tube being connected to said bias voltage during a third pulse interval immediately following said two successive pulse intervals to provide an intense but unmodulated electron beam, a spiral sweep circuit connected to said electrostatic deflection plates to cause scanning of said electron beam over said mosaic during each pulse interval, a load impedance connected to said signal plate, a video amplifier connected to amplify an output from said storage tube appearing across said load impedance during said pulse interval when said electron beam is unmodulated, the output of said video amplifier representing moving targets being applied to the indicator of said radar system, a lamp to illuminate said mosaic at the end of said third pulse interval, and electronic switching means to reconnect the aforementioned elements between successive pulse intervals.

3. In a radio echo detection system wherein fixed targets are evidenced by video pulses of substantially constant amplitude and moving targets are evidenced by video pulses of cyclically varying amplitude, a storage tube having an electron beam and including a storage mosaic, means for causing said beam to scan said mosaic at each pulse transmission means for applying video pulse patterns from said system to said storage mosaic with opposite polarity for two successive scan intervals by modulation of said electron beam, and means for deriving an output signal from said mosaic during a third successive scan interval, said electron beam being unmodulated during said third scan interval, said output representing the difference between said pulse patterns of reversed polarity.

4. In a radio echo detection system wherein fixed targets are evidenced by video pulses of substantially constant amplitude and moving targets are evidenced by video pulses of cyclically varying amplitude, a storage tube having an electron beam and including a storage mosaic, means for causing said beam to scan said mosaic at each pulse transmission means for applying video pulse patterns from said system to said storage mosaic with opposite polarity for two successive scan intervals by modulation of said electron beam, means for deriving an output signal from said mosaic during a third successive scan interval, said electron beam being unmodulated during said third scan interval, said output representing the difference between said pulse patterns of reversed polarity, and means for illuminating said mosaic to remove residual charge from said mosaic at the end of said third scan interval in preparation for a repetition of the sequence of events.

5. In a radio echo detection system wherein fixed targets are evidenced by video pulses of substantially constant amplitude and moving targets are evidenced by video pulses of cyclically varying amplitude, a storage tube having an electron beam and including a storage mosaic, means for applying video pulse patterns from said system to said storage mosaic with opposite polarity for two successive pulse intervals by modulation of said electron beam, means for deriving an output signal from said mosaic during a third successive pulse interval, said electron beam being unmodulated during said third pulse interval, said output representing the difference between said pulse patterns of reversed polarity, and means for illuminating said mosaic at the end of said third pulse interval to remove residual charge thereon in preparation for a repetition of the sequence of events.

6. In a radio echo detection system wherein fixed targets are evidenced by video pulses of substantially constant amplitude and moving targets are evidenced by video pulses of cyclically varying amplitude, a storage tube having an electron beam and including a photoelectric storage mosaic, means for causing said beam to scan said mosaic at each pulse transmission means for applying video pulse patterns from said system to said storage mosaic with opposite polarity during two successive scan intervals by modulation of said electron beam, means for intensifying said electron beam during the third successive scan interval, means for deriving an output signal from said mosaic during said third scan interval, said output signal representing only moving targets, and means for removing residual charge on said mosaic by illumination thereof at the end of said third successive scan interval.

7. In a radio echo detection system wherein fixed targets are evidenced by video pulses of substantially constant amplitude and moving targets are evidenced by video pulses of cyclically varying amplitude, a storage tube having an electron beam and including a storage mosaic, means for applying video pulse patterns from said system to said storage mosaic with opposite polarity during two successive pulse intervals by modulation of said electron beam, means for intensifying said electron beam during the third successive pulse interval, means for deriving an output signal from said mosaic during said third pulse interval, said output signal representing only moving targets, and means for instantaneously illuminating said mosaic at the end of said third pulse interval to remove residual charge thereon.

8. In a radio echo detection system wherein fixed targets are evidenced by video pulses of substantially constant amplitude and moving targets are evidenced by video pulses of cyclically varying amplitude, a storage tube having an electron beam and including a control grid and a photoelectric storage mosaic, the grid of said tube being connected to said system during two successive pulse intervals for intensity modulating said electron beam in accordance with the video pulse pattern from said system, means for causing said electron beam to scan the same path on said mosaic during each pulse interval, means for reversing the polarity of said video pulse pattern during the second of said two successive pulse intervals, means for applying an unmodulated intensifying voltage to said control grid during the third successive pulse interval, means for deriving a signal indicative of moving targets from said mosaic during said third pulse interval, and means for removing residual charge from said mosaic by illumination at the end of said third pulse interval.

9. In a pulse radar system of the coherent type wherein fixed targets are evident by video pulses of substantially constant amplitude and moving targets are evidenced by video pulses of cyclically varying amplitude the combination of, an electron beam storage tube, said storage tube having as a component thereof a photo-sensitive mosaic, means for controlling the electron beam of said tube so as to have it scan said mosaic in synchronism with the operation of said pulse radar system, means for changing the intensity of said beam during a pair of successive scans in opposite directions and by an amount corresponding to the amplitude of the video signals detected by said radar system during the corresponding pair of pulse intervals, an output circuit coupled to said mosaic, means for maintaining the intensity of said beam at a high constant value during a following scan of said mosaic whereby the change in electron charge of said mosaic produces a signal train at said output circuit which contains signal components representing only moving targets detected by said radar system and means for evenly illuminating said mosaic after the termination of said last-mentioned scan thereby to restore said mosaic to a uniformly charged condition.

References Cited in the file of this patent

UNITED STATES PATENTS

| | | |
|---|---|---|
| 2,146,822 | Heuroleau | Feb. 14, 1939 |
| 2,403,562 | Smith | July 9, 1946 |
| 2,410,424 | Brown | Nov. 5, 1946 |
| 2,412,669 | Bedford | Dec. 17, 1946 |
| 2,422,295 | Eaton | June 17, 1947 |
| 2,437,173 | Rutherford | Mar. 2, 1948 |
| 2,491,450 | Holmes | Dec. 13, 1949 |
| 2,523,283 | Dickson | Sept. 26, 1950 |
| 2,530,828 | Leverenz | Nov. 21, 1950 |
| 2,666,137 | Cunningham | June 12, 1954 |